United States Patent
Fedec et al.

(10) Patent No.: US 12,552,884 B2
(45) Date of Patent: Feb. 17, 2026

(54) PROPYLENE-ETHYLENE COPOLYMER COMPOSITIONS SUITABLE FOR HOT FILL PACKAGING OF FOODSTUFFS

(71) Applicant: W.R. GRACE & CO .- CONN., Columbia, MD (US)

(72) Inventors: Matthew Fedec, Columbia, MD (US); Jan Van Egmond, Columbia, MD (US); Manu Rego, Columbia, MD (US); John Kaarto, Columbia, MD (US); Li-Min Tau, Columbia, MD (US)

(73) Assignee: W.R. Grace & Co.-Conn., Columbia, MD (US)

( * ) Notice: Subject to any disclaimer, the term of this patent is extended or adjusted under 35 U.S.C. 154(b) by 125 days.

(21) Appl. No.: 18/530,084

(22) Filed: Dec. 5, 2023

(65) Prior Publication Data
US 2024/0150503 A1 May 9, 2024

Related U.S. Application Data

(63) Continuation of application No. 16/972,863, filed as application No. PCT/US2019/036046 on Jun. 7, 2019, now Pat. No. 11,873,355.
(Continued)

(51) Int. Cl.
*C08L 23/16* (2006.01)
*C08F 210/06* (2006.01)
(Continued)

(52) U.S. Cl.
CPC .......... *C08F 210/06* (2013.01); *C08F 210/16* (2013.01); *C08K 5/053* (2013.01);
(Continued)

(58) Field of Classification Search
CPC ..... C08L 23/16; C08K 5/0083; C08F 210/16; C08F 2500/35; C08F 2500/12; C08F 2800/20
See application file for complete search history.

(56) References Cited

U.S. PATENT DOCUMENTS

| | | | |
|---|---|---|---|
| 4,355,721 A | 10/1982 | Knott et al. | |
| 6,057,413 A * | 5/2000 | Ima | C08F 10/00 526/348 |

(Continued)

FOREIGN PATENT DOCUMENTS

| | | |
|---|---|---|
| CA | 3035069 A1 | 3/2018 |
| JP | H09-067416 A | 3/1997 |

(Continued)

OTHER PUBLICATIONS

Biao Zhang et al. "Preparation and characterization of high MFR polypropylene and polypropylene/poly(ethylene-co-propylene) in-reactor alloys" // J. Appl. Polym., V. 133, I. 8, pp. 42984-42984 pub. on Mar. 11, 2015.
(Continued)

*Primary Examiner* — Rip A Lee
(74) *Attorney, Agent, or Firm* — Dority & Maqnning, P. A.

(57) ABSTRACT

A propylene-ethylene copolymer includes propylene as a primary monomer, an ethylene content (ET) of 3.0% to 5% by weight, a melt flow rate of from 20 to 45 g/10 min, a xylene soluble fraction (XS) of from 2.0% to 7.0% by weight, and an XS/ET ratio of less than or equal to 1.51.

20 Claims, 1 Drawing Sheet

Related U.S. Application Data

(60) Provisional application No. 62/683,113, filed on Jun. 11, 2018.

(51) Int. Cl.

| | | |
|---|---|---|
| *C08F 210/16* | (2006.01) | |
| *C08K 5/053* | (2006.01) | |
| *C08K 5/1575* | (2006.01) | |
| *C08K 5/5419* | (2006.01) | |
| *C08L 23/14* | (2006.01) | |
| *C08K 5/00* | (2006.01) | |

(52) U.S. Cl.
CPC .......... *C08K 5/1575* (2013.01); *C08K 5/5419* (2013.01); *C08L 23/14* (2013.01); *C08L 23/16* (2013.01); *C08F 2500/12* (2013.01); *C08F 2500/20* (2013.01); *C08F 2500/35* (2021.01); *C08K 5/0083* (2013.01); *C08L 2203/30* (2013.01); *C08L 2314/02* (2013.01)

(56) References Cited

U.S. PATENT DOCUMENTS

| | | | |
|---|---|---|---|
| 7,452,953 B2 | 11/2008 | Jaaskelainen et al. | |
| 7,470,756 B2 | 12/2008 | Jaaskelainen et al. | |
| 7,579,422 B2 | 8/2009 | Jaaskelainen et al. | |
| 7,683,141 B2 | 3/2010 | Jaaskelainen et al. | |
| 7,772,338 B2 | 8/2010 | Terreur et al. | |
| 8,541,507 B2 * | 9/2013 | Doshev .................. | C08L 23/12 525/191 |
| 8,889,753 B2 | 11/2014 | Bernreitner et al. | |
| 9,328,182 B2 * | 5/2016 | Burmaster ................. | C08J 5/00 |
| 9,676,883 B2 * | 6/2017 | Piemontesi ........... | C08F 210/06 |
| 9,790,300 B2 * | 10/2017 | Wang .................... | C08F 210/06 |
| 10,155,827 B2 * | 12/2018 | Massari .................... | C08J 5/18 |
| 11,299,612 B2 | 4/2022 | Kaarto et al. | |
| 11,905,347 B2 * | 2/2024 | Fedec .................. | C08K 5/1575 |
| 2007/0202285 A1 | 8/2007 | Burmaster et al. | |
| 2009/0118451 A1 * | 5/2009 | Fuchs ................... | C08F 210/06 526/351 |
| 2011/0065873 A1 | 3/2011 | Grein et al. | |
| 2012/0088086 A1 | 4/2012 | Grien et al. | |
| 2014/0124405 A1 | 5/2014 | Tau et al. | |
| 2016/0115262 A1 * | 4/2016 | Wang ......................... | C08J 5/00 526/159 |
| 2017/0066855 A1 | 3/2017 | Massari et al. | |
| 2017/0073444 A1 | 3/2017 | Piemontesi et al. | |
| 2021/0246240 A1 | 8/2021 | Fedec et al. | |
| 2022/0145055 A1 | 5/2022 | Wang et al. | |

FOREIGN PATENT DOCUMENTS

| | | |
|---|---|---|
| JP | H11-106434 A | 4/1999 |
| JP | 63-000419 | 2/2000 |
| JP | 2009-019119 A | 1/2009 |
| JP | 2009-155422 A | 7/2009 |
| JP | 2014-523959 A | 9/2014 |
| JP | 2015-506391 A | 3/2015 |
| JP | 2017-514000 | 6/2017 |
| KR | 2016-0143857 A | 12/2016 |
| RU | 2009119449 A | 11/2010 |
| WO | WO-2015/169653 A1 | 11/2015 |
| WO | WO-2015/169831 A1 | 11/2015 |
| WO | WO-2017/188255 A1 | 2/2019 |

OTHER PUBLICATIONS

Office Action on KR Application No. 2020-7034884 Dated Jun. 12, 2024 (20 pages).

* cited by examiner

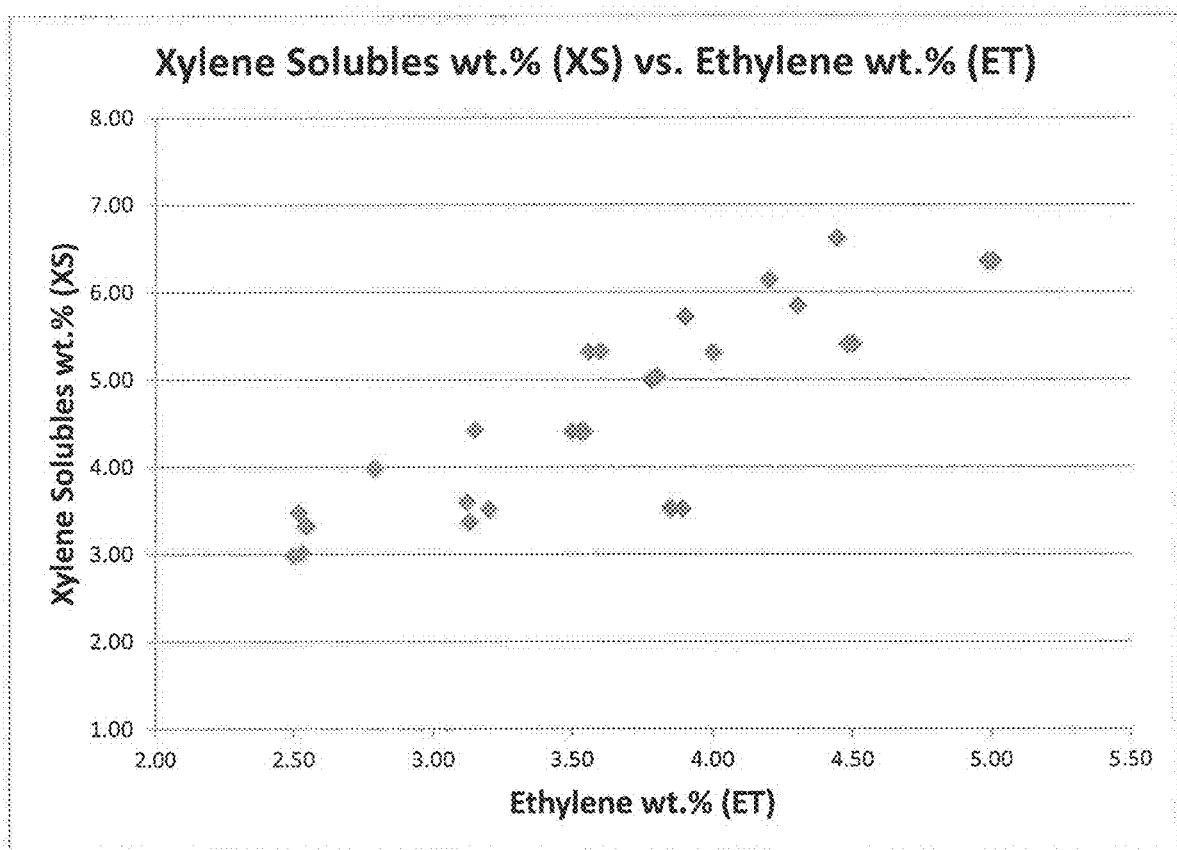

PROPYLENE-ETHYLENE COPOLYMER COMPOSITIONS SUITABLE FOR HOT FILL PACKAGING OF FOODSTUFFS

CROSS-REFERENCE TO RELATED APPLICATIONS

This U.S. patent application is a continuation of application Ser. No. 16/972,863, filed on Dec. 7, 2020, now U.S. Pat. No. 11,873,355 which is a U.S. National Phase Application under 35 U.S.C. § 371 of International Patent Application No. PCT/US2019/0360246, filed on Jun. 7, 2019, which in turn claims the benefit of and priority to U.S. Provisional Patent application Ser. No. 62/683,113, filed on Jun. 11, 2018, all of which are incorporated herein by reference for any and all purposes.

FIELD

The present disclosure relates to propylene-ethylene copolymer compositions and methods of production. The compositions of the present disclosure are particularly well suited for hot fill packaging of foodstuffs.

BACKGROUND

Hot fill packaging is a method that is applied in both the food and beverage industry and is commonly used for packaging products including beverages, dips, and soups. Hot fill packaging is often used as part of the pasteurization process fix products designed to have extended shelf lives lasting up to a year. Hot fill packaging faces various challenges as polymers at high temperatures have a tendency to lose their packaging properties including stiffness and strength.

As the hot fill packaging interfaces with products meant for human consumption, there is a concern that the hot fill packaging may degrade in properties. For instance, heating the polymer composition during the hot fill packaging process can cause unwanted breakdown of the polymer or other components in the composition.

In the past, higher melting point polypropylene homopolymers have been used in hot filled packaging applications in order to prevent distortion. Polypropylene homopolymers, however, have poor transparency properties. In order to improve transparency, polypropylene random copolymers have been suggested. Polypropylene random copolymers, however, do not possess the heat resistance properties of polypropylene homopolymers and can also fail to provide long term transparency properties.

In view of the above, a need currently exists for a polymer composition for producing hot filled packaging that not only has improved stiffness and heat resistance but also possesses excellent transparency properties.

SUMMARY

In general, the present disclosure is directed to propylene copolymers that have been found to have an excellent balance of properties. The polymers are particularly well suited to being used in producing hot fill packaging. In particular, the copolymers of the present disclosure have higher stiffness making them well suited for producing injection molded articles. In addition, the polymer composition of the present disclosure has extremely low extractables, exhibits low blooming over time and can be constructed to have a higher heat deflection temperature. In addition, the polymer composition can also display excellent haze properties. Of particular, advantage, it was discovered that the polymer composition of the present disclosure also can maintain high haze properties even after thermal aging. In this regard, the polymer compositions of the present disclosure are well suited to producing various different types of containers, especially hot fill packaging containers that may be subjected to multiple heat cycles. In accordance with the present disclosure, the containers not only have excellent physical properties, but also have long lasting transparency properties.

In addition to hot filled packaging containers, the polymer compositions of the present disclosure can be used to produce various other molded articles. For instance, the polymer composition is well suited to producing storage containers. Such storage containers, for instance, can be used to store items in non-air conditioned locations, such as attics, garages, warehouses, and other storage facilities. The storage containers can include a bottom defining a hollow interior. The bottom can be made entirely from the polymer composition and can have excellent transparency properties. The container can also include a lid that cooperates with the bottom to form a seal.

The present disclosure includes propylene-ethylene copolymer compositions and methods of producing propylene-ethylene copolymer compositions. The compositions can be random copolymers that are particularly well suited for hot fill packaging of foodstuffs. The copolymer compositions can be produced using a Ziegler-Natta catalyst and an alkoxysilane electron donor. The compositions can have propylene as a primary monomer with an ethylene content ranging from 2.0 to 5.0 percent by weight. The compositions can have melt flow rates of greater than 1 g/10 min, such as greater than 10 g/10 min and a xylene soluble content of less than 7.0 percent by weight. The compositions, in one embodiment, have a ratio of xylene solubles weight percent to ethylene content weight percent of less than or equal to about 1.5, such as less than about 1.4, such as less than about 1.3, such as less than about 1.2, such as less than about 1.1, such as even less or equal to 1. Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures.

FIG. 1 is a graph of xylene solubles weight percent (XS) versus ethylene content weight percent (ET) of propylene-ethylene copolymer samples according to the present disclosure.

DETAILED DESCRIPTION

The present disclosure includes propylene-ethylene copolymer compositions and methods of producing propylene-ethylene copolymer compositions. The compositions can include propylene-ethylene random copolymers. The propylene-ethylene copolymer compositions can be particularly well suited for hot fill packaging of foodstuffs. Specifically, the propylene-ethylene copolymer compositions of the present disclosure can be used to form rigid hot fill containers and films for packaging and sealing food and beverages. The compositions of the present disclosure can be particularly beneficial for use with foodstuffs that must be pasteurized at the time of packaging.

Advantages of the various propylene-ethylene copolymer compositions of the present disclosure include increased stiffness for use in containers. The compositions can also have reduced blooming and reduced haze, even under elevated temperature conditions and over extended periods of time. Compositions of the present disclosure can have reduced. extractable and xylene soluble content, making the polymer compositions safe for consumer use and more readily complaint with U.S. Food and Drug Administration (FDA) standards. The propylene-ethylene copolymer compositions of the present disclosure can also be used for packaging designed for microwave reheating of stored foods.

A first embodiment of the present disclosure includes propylene-ethylene random copolymer compositions. The copolymer compositions can be produced using a. Ziegler-Natta catalyst and an alkoxysilane electron donor. The compositions can have propylene as a primary monomer with an ethylene content ranging from 2.0 to 6.0 percent by weight. The compositions can have melt flow rates of from 1 to 100 g/10 min and a xylene solubles content of less than 7.0 percent by weight.

I. Definitions and Testing Procedures

The term "propylene-ethylene copolymer", as used herein, is a copolymer containing a majority weight percent propylene monomer with ethylene monomer as a secondary constituent. A "propylene-ethylene copolymer" (also sometimes referred to as a polypropylene random copolymer, PPR, PP-R, RCP or RACO) is a polymer having individual repeating units of the ethylene monomer present in a random or statistical distribution in the polymer chain.

Melt flow rate (MFR), as used herein, is measured in accordance with the ASTM D 1238 test method at 230° C. with a 2.16 kg weight for propylene-based polymers. The melt flow rate can be measured in pellet form or on the reactor powder. When measuring the reactor powder, a stabilizing package can be added including 2000 ppm of CYANOX 2246 antioxidant (methylenebis(4-methyl-6-tert-butylphenol) 2000 ppm of IRGAFOS 168 antioxidant (tris (2,4-di-tert-butylphenyl)phosphite) and 1000 ppm of acid scavenger ZnO.

Xylene solubles (XS) is defined as the weight percent of resin that remains in solution after a sample of polypropylene random copolymer resin is dissolved in hot xylene and the solution is allowed to cool to 25° C. This is also referred to as the gravimetric XS method according to ASTM D5492-98 using a 90 minute precipitation time and is a referred to herein as the "wet method." Xylene solubles is measured on the reactor powder without the addition of any other additives.

The xylene soluble portion is determined by a method adapted from ASTM D5492-06 and also sometimes referred to herein as the "wet method". The procedure consists of weighing 2 g of sample and dissolving the sample in 200 ml o-xylene in a 400 ml flask with 24/40 joint. The flask is connected to a water cooled condenser and the contents are stirred and heated to reflux under nitrogen ($N_2$), and then maintained at reflux for an additional 30 minutes. The solution is then cooled in a temperature controlled water bath at 25° C. for 90 minutes to allow the crystallization of the xylene insoluble fraction. Once the solution is cooled and the insoluble fraction precipitates from the solution, the separation of the xylene soluble portion (XS) from the xylene insoluble portion (XI) is achieved by filtering through 25 micron filter paper. One hundred ml of the filtrate is collected into a pre-weighed aluminum pan, and the o-xylene is evaporated from this 100 ml of filtrate under a nitrogen stream. Once the solvent is evaporated, the pan and contents are placed in a 100° C. vacuum oven for 30 minutes or until dry. The pan is then allowed to cool to room temperature and weighed. The xylene soluble portion is calculated as XS (wt %)=$[(m_3-m_2)*2/m_1]*100$, where $m_1$ is the original weight of the sample used, $m_2$ is the weight of empty aluminum pan, and $m_3$ is the weight of the pan and residue (the asterisk, *, here and elsewhere in the disclosure indicates that the identified terms or values are multiplied).

The term "tacticity" generally refers to the relative stereochemistry of adjacent chiral centers within in a macromolecule or polymer. For example, in a propylene-based polymer, the chirality of adjacent monomers, such as two propylene monomers, can be of either like or opposite configuration. The term "diad" is used to designate two contiguous monomers and three adjacent monomers are called a "triad." If the chirality of adjacent monomers is of the same relative configuration, the diad is considered isotactic; if opposite in configuration, it is termed syndiotactic. Another way to describe the configurational relationship is to term contiguous pairs of monomers having the same chirality as meso (m) and those of opposite configuration racemic (r).

Tacticity or stereochemistry of macromolecules generally and polypropylene or polypropylene random copolymers in particular can be described or quantified by referring to triad concentration. An isotactic triad, typically identified with the shorthand reference "mm", is made up of two adjacent meso diads, which have the same configuration, and so the stereoregularity of the triad is identified as "mm". If two adjacent monomers in a three-monomer sequence have the same chirality and that is different from the relative configuration of the third unit, this triad has 'mr' tacticity. An 'rr' triad has the middle monomer unit having an opposite configuration from either neighbor. The fraction of each type of triad in the polymer can be determined and when multiplied by 100 indicates the percentage of that type found in the polymer. The mm percentage is used to identify and characterize the polymers herein.

The sequence distribution of monomers in the polymer may be determined by $^{13}$C-NMR, which can also locate ethylene residues in relation to the neighboring propylene residues. $^{13}$C NMR can be used to measure ethylene content, Koenig B-value, triad distribution, and triad tacticity, and is performed as follows:

The samples are prepared by adding approximately 2.7 g of a 50/50 mixture of tetrachloroethane-$d^2$/orthodichlorobenzene containing 0.025 M $Cr(AcAc)_3$ to 0.20 g sample in a Norell 1001-7 10 mm NMR tube. The samples are dissolved and homogenized by heating the tube and its contents to 150° C. using a heating block and heat gun. Each sample is visually inspected to ensure homogeneity.

The data are collected using a Balker 400 MHz spectrometer equipped with a Balker Dual DLL high-temperature CryoProbe. The data are acquired using 320 transients per data file, a 6 sec pulse repetition delay, 90 degree flip angles, and inverse gated decoupling with a sample temperature of 120° C. All measurements are made on non-spinning samples in locked mode. Samples are allowed to thermally equilibrate for 7 minutes prior to data acquisition. Percent mm tacticity and weight % ethylene are calculated according to methods commonly used in the art, which is briefly summarized as follows.

With respect to measuring the chemical shifts of the resonances, the methyl group of the third unit in a sequence of 5 contiguous propylene units consisting of head-to-tail bonds and having the same relative chirality is set to 21.83 ppm. The chemical shift of other carbon resonances are determined by using the above-mentioned value as a reference. The spectrum relating to the methyl carbon region (17.0-23 ppm) can be classified into the first region (21.1-21.9 ppm), the second region (20.4-21.0 ppm), the third region (19.5-20.4 ppm) and the fourth region (17.0-17.5 ppm). Each peak in the spectrum is assigned with reference to a literature source such as the articles in, for example, *Polymer*, T. Tsutsui et al., Vol. 30, Issue 7, (1989) 1350-1356 and/or *Macromolecules*, H. N. Cheng, 17 (1984) 1950-1955, the contents of which are incorporated herein by reference.

In the first region, the signal of the center methyl group in a PPP (mm) triad is located. In the second region, the signal of the center methyl group in a PPP (mr) triad and the methyl group of a propylene unit whose adjacent units are a propylene unit and an ethylene unit resonates (PPE-methyl group). In the third region, the signal of the center methyl group in a PPP (rr) triad and the methyl group of a propylene unit whose adjacent units are ethylene units resonate (EPE-methyl group)

PPP (mm), PPP (mr) and PPP (rr) have the following three-propylene units-chain structure with head-to-tail bonds, respectively. This is shown in the Fischer projection diagrams below.

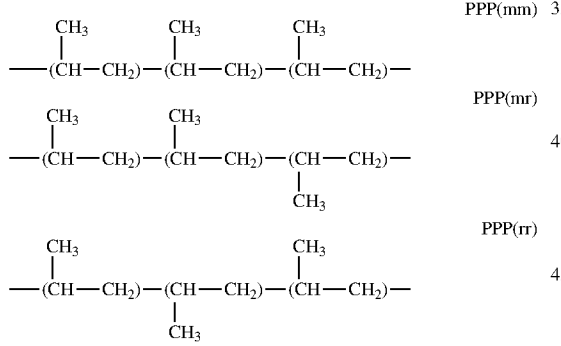

The triad tacticity (mm fraction) of the propylene random copolymer can be determined from a $^{13}$C-NMR spectrum of the propylene random copolymer using the following formula:

$$\text{mm Fraction} = \frac{PPP(\text{mm})}{PPP(\text{mm}) + PPP(\text{mr}) + PPP(\text{rr})}$$

The peak areas used in the above calculation are not measured directly from the triad regions in the $^{13}$C-NMR spectrum. The intensities of the mr and rr triad regions need to have subtracted from them the areas due to EPP and EPE sequencing, respectively. The EPP area can be determined from the signal at 30.8 ppm after subtracting from it one-half the area of the sum of the signals between 26 and 27.2 ppm and the signal at 30.1 ppm. The area due to EPE can be determined from the signal at 33.2 ppm.

For convenience, ethylene content is also measured using a Fourier Transform Infrared method (FTIR) which is correlated to ethylene values determined using $^{13}$C NMR, noted above, as the primary method. The relationship and agreement between measurements conducted using the two methods is described in, e.g., J. R. Paxson, J. C. Randall, "Quantitative Measurement of Ethylene incorporation into Propylene Copolymers by Carbon-13 Nuclear Magnetic Resonance and Infrared Spectroscopy", Analytical Chemistry, Vol. 50 No. 13, Nov. 1978, 1777-1780.

The "Koenig B-value" or "B-value" or chi statistic is one measure of randomness or blockiness in a propylene ethylene random copolymer. A Koenig B-value of 1.0 indicates a random copolymer and a value of zero indicates complete blocks of monomers A and B; in the present disclosure, propylene and ethylene. A Koenig B-value of 2 indicates a perfectly alternating copolymer (i.e., a polymer defined by the structure. A-B-A-B-A-B). The Koenig B-value can be calculated as: B=[EP]/(2[P][E]), where [EP] is the total mole fraction of EP dimers (EP+PE, or (EEP+PPE+PEP+EPE)), and [E] is the mole fraction ethylene, and [P]=1−[E]. See Koenig, Jack L.; Spectroscopy of Polymers, 2nd ed. for details of determining and calculating the Koenig B-value.

Gardner impact Testing is measured in accordance with ASTM Test No. D5420.

IZOD impact strength is measured in accordance with ASTM Test No. D256 on specimens molded according to ASTM Test D4101.

Flexural Modulus is determined in accordance with ASTM Test D790-10 Method A at 1.3 mm/min, using a type 1 specimen per ASTM Test 3641 and molded according to ASTM Test D4101.

II. Propylene-Ethylene Random Copolymer Compositions

Propylene-ethylene copolymer compositions of the present disclosure can include a majority weight percent propylene monomer with ethylene monomer as a secondary constituent. The ethylene content (ET) of the propylene-ethylene copolymer compositions of the present disclosure can be from about 2.0 to up to about 5.0 percent by weight of the copolymer, preferably from about 2.5 to about 5.0 percent by weight, and more preferably from about 3.0 to about 5.0 percent by weight.

The xylene soluble (XS) fraction for the copolymers of the present invention (by the wet method) can be less than or equal to (≤)7.0% by weight of the copolymer, or ≤6.0% by weight, more preferably ≤5.0% by weight, and still more preferably ≤4% by weight, for example, ≤6.5% by weight, ≤5.5% by weight, ≤4.5 by weight, or ≤3.5% by weight. The xylene soluble (XS) fraction is preferably in the range of from 2.0% to 7.0% by weight, from 2.5% to 6.5% by weight, and more preferably 3.0% to 6.0% by weight. The MFR for the copolymers of the present disclosure can be in the range of from 10 to 100 g/10 min, more preferably in the range of from 10 to 50 g/10 min.

The weight ratio of xylene soluble (XS) to the ethylene Content (ET) is an important aspect of the embodiments of the present disclosure and can be referred to as the xylene solubles to ethylene ratio, or the XS/ET ratio. The XS/ET ratio of propylene-ethylene copolymer compositions of the present disclosure can be less than or equal to (≤)1.5, or ≤1.4, more preferably ≤1.2, and still more preferably ≤1.0, for example, ≤1.8, ≤1.4, ≤1.1, or ≤0.95. The XS/ET ratio can also be in the range of from 0.5 to 1.51, from 1.0 to 1.5, from 1.1 to 1.4, and more preferably from 1.15 to 1.35.

The xylene soluble wt. % (XS) and the ethylene wt. % (ET) of the copolymer compositions of the present disclosure can be described by their position on a scatter plot of xylene soluble wt. % (XS) versus ethylene wt. % (ET), as shown in FIG. 1. For example, the xylene soluble wt. % (XS) and the ethylene wt. % (ET) of embodiments of the present disclosure can fall below a line defined by the equation $XS=2.0e^{0.297(ET)}$, such as below the line $XS=1.9e^{0.297(ET)}$, and such as below the line $XS=1.8e^{0.297(ET)}$. The xylene soluble wt. % (XS) and the ethylene wt. % (ET) of embodiments of the present disclosure can also be above a line defined by the equation $XS=1.1e^{0.297(ET)}$, such as above the line $XS=1.3e^{0.297(ET)}$, such as above the line $XS=1.4e^{0.297(ET)}$, such as above the line $XS=1.5e^{0.297(ET)}$, and such as above the line $XS=1.6e^{0.297(ET)}$.

In one embodiment, the polymer composition may contain a nucleator. For instance, the nucleator may be an alpha nucleator. Examples of nucleators and/or clarifiers that may be used in the polymer composition include benzene amid derivatives, sorbitol derivatives, nonitol derivatives, and mixtures thereof. Particular examples of nucleating agents include NA-11 nucleator marketed by Adeka Palmarole SAS, such as sodium 2,2-methylene-bis-(4,6-di-tert-butylphenyl)phosphate. Other nucleators that may be used include the HPN nucleators marketed by Milliken and Company of Spartanburg, South Carolina including HPN-600ei. Other suitable clarifiers from Milliken include Millad NX8000 and Millad 3988i.

The copolymer of the present disclosure generally has a relatively broad molecular weight distribution. For instance, the molecular weight distribution (Mw/Mn) is generally greater than about 3.5, such as greater than about 3.8, such as greater than about 4, such as greater than about 4.3, such as greater than about 4.5, such as greater than about 4.8, such as greater than about 5, such as greater than about 5.2, such as greater than about 5.5, such as greater than about 5.7, such as greater than about 6 and is generally less than about 10, such as less than about 8, such as less than about 7.5. The weight average molecular weight is determined by GPC.

III. Propylene-Ethylene Random Copolymer Production

Embodiments of the present invention can be made by any process for polymerizing propylene-based polymers known in the art. This includes the UNIPOL® gas phase process, using a supported Ziegler-Natta catalyst. Particularly preferable are CONSISTA® catalysts available from W.R. Grace & Co., Columbia, Maryland. Suitable polypropylene random copolymers may be produced using a single reactor or multiple reactors to produce a multimodal product. For some embodiments, it is preferred to use internal electron donors which do not contain phthalates.

Processes and catalyst compositions for preparing useful PP-R copolymers are disclosed, for example, in WO 2011/084628, and others are generally disclosed in U.S. Pat. Nos. 7,381,779; 7,491,670; 7,678,868; 7,781,363; and 7,989,383. Propylene-ethylene random copolymers having high molecular weight and low MFR are produced using stereospecific catalysts and sometimes referred to as "6th generation" Ziegler-Natta catalysts containing non-phthalate internal donors, such as those disclosed in U.S. Pat. Nos. 8,288,585; 8,536,372; 8,778,826; US 2013/0338321; and/or WO 2010/078494 and others. Also suitable are so-called "4th generation" Ziegler-Natta catalysts, typically containing phthalate internal donors (e.g., diisobutyl phthalate, DIBP). Each of the forgoing cited patents are hereby incorporated by reference.

Procatalyst compositions suitable for use in producing the polypropylene random (PP-R) copolymers include Ziegler-Natta procatalyst compositions. Any conventional Ziegler-Natta procatalyst may be used in the present catalyst composition as is commonly known in the art provided it is capable of producing the claimed PP-R copolymers. In an embodiment, the Ziegler-Natta procatalyst composition contains titanium moiety such as titanium chloride, magnesium moiety such as magnesium chloride, and an internal electron donor.

In an embodiment, the internal electron donor comprises a substituted phenylene aromatic diester. In an embodiment, a 1,2-phenylene aromatic diester is provided. The substituted 1,2-phenylene aromatic diester has the structure (I) below:

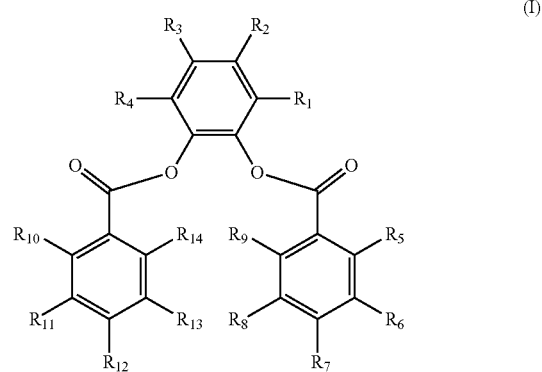

(I)

wherein $R_1$-$R_{14}$ are the same or different. Each of $R_1$-$R_{14}$ is selected from a hydrogen, substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least one of $R_1$-$R_{14}$ is not hydrogen.

As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

As used herein, the terms "substituted hydrocarbyl" and "substituted hydrocarbon" refer to a hydrocarbyl group that is substituted with one or more nonhydrocarbyl substituent groups. A nonlimiting example of a nonhydrocarbyl substituent group is a heteroatom. As used herein, a "heteroatom" refers to an atom other than carbon or hydrogen. The heteroatom can be a non-carbon atom from Groups IV, V, VI, and VII of the Periodic Table. Nonlimiting examples of heteroatoms include: halogens (F, Cl, Br, I), N, O, P, B, S, and Si. A substituted hydrocarbyl group also includes a halohydrocarbyl group and a silicon-containing hydrocarbyl group. As used herein, the term "halohydrocarbyl" group refers to a hydrocarbyl group that is substituted with one or more halogen atoms. As used herein, the term "silicon-containing hydrocarbyl group" is a hydrocarbyl group that is substituted with one or more silicon atoms. The silicon atoms) may or may not be in the carbon chain.

The procatalyst precursor can include (i) magnesium, (ii) a transition metal compound of an element from Periodic Table groups IV to VIII, (iii) a halide, an oxyhalide, and/or an alkoxide of (i) and/or (ii), and (iv) combinations of (i), (ii), and (iii). Nonlimiting examples of suitable procatalyst precursors include halides, oxyhalides, and alkoxides of magnesium, manganese, titanium, vanadium, chromium, molybdenum, zirconium, hafnium, and combinations thereof.

In an embodiment, the procatalyst precursor is a magnesium moiety compound (MagMo), a mixed magnesium titanium compound (MagTi), or a benzoate-containing magnesium chloride compound (BenMag). In an embodiment, the procatalyst precursor is a magnesium moiety ("MagMo") precursor. The "MagMo precursor" contains magnesium as the sole metal component. The MagMo precursor includes a magnesium moiety. Nonlimiting examples of suitable magnesium moieties include anhydrous magnesium chloride and/or its alcohol adduct, magnesium alkoxide or aryloxide, mixed magnesium alkoxy halide, and/or carboxylated magnesium dialkoxide or aryloxide. In one embodiment, the MagMo precursor is a magnesium di($C_{1-4}$)alkoxide. In a further embodiment, the MagMo precursor is diethoxymagnesium.

In an embodiment, the procatalyst precursor is a mixed magnesium/titanium compound ("MagTi"). The "MagTi precursor" has the formula $Mg_dTi(OR^e)_fX_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine, preferably chlorine; d is 0.5 to 56, or 2 to 4; f is 2 to 116 or 5 to 15; and g is 0.5 to 116, or 1 to 3. The precursors are prepared by controlled precipitation through removal of an alcohol from the reaction mixture used in their preparation. In an embodiment, a reaction medium comprises a mixture of an aromatic liquid, especially a chlorinated aromatic compound, most especially chlorobenzene, with an alkanol, especially ethanol. Suitable halogenating agents include titanium tetrabromide, titanium tetrachloride or titanium trichloride, especially titanium tetrachloride. Removal of the alkanol from the solution used in the halogenation results in precipitation of the solid precursor, having especially desirable morphology and surface area. Moreover, the resulting precursors are particularly uniform in particle size.

The present procatalyst composition can also include an internal electron donor. As used herein, an "internal electron donor" is a compound added during formation of the procatalyst composition that donates a pair of electrons to one or more metals present in the resultant procatalyst composition. Not bounded by any particular theory, it is believed that the internal electron donor assists in regulating the formation of active sites and thus enhances catalyst stereoselectivity. In an embodiment, the internal electron donor includes a substituted phenylene aromatic diester of structure (I), identified above.

In an embodiment, a procatalyst composition is provided which includes a combination of a magnesium moiety, a titanium moiety and an internal electron donor. The internal electron donor includes the substituted phenylene aromatic diester. The procatalyst composition is produced by way of a halogenation procedure described in detail in U.S. Pat. No. 8,536,372, incorporated herein by reference, which converts the procatalyst precursor and the substituted phenylene aromatic diester donor into the combination of the magnesium and titanium moieties, into which the internal electron donor is incorporated. The procatalyst precursor from which the procatalyst composition is formed can be the magnesium moiety precursor, the mixed magnesium/titanium precursor, or the benzoate-containing magnesium chloride precursor.

In an embodiment, the magnesium moiety is a magnesium halide. In another embodiment, the magnesium halide is magnesium chloride, or magnesium chloride alcohol adduct. In an embodiment, the titanium moiety is a titanium halide such as a titanium chloride. In another embodiment the titanium moiety is titanium tetrachloride. In another embodiment, the procatalyst composition includes a magnesium chloride support upon which a titanium chloride is deposited and upon which the internal electron donor is incorporated.

In an embodiment, the internal electron donor of the procatalyst composition includes the substituted phenylene aromatic diester of structure (I), illustrated above, wherein $R_1$-$R_{14}$ are the same or different; each of $R_1$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof; and at least one of $R_1$-$R_{14}$ is not hydrogen.

In an embodiment, at least one (or two, or three, or four) R group(s) of $R_1$-$R_4$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In an embodiment, at least one (or some, or all) R group(s) of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_5$-$R_9$ and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In an embodiment, at least one of $R_1$-$R_4$ and at least one of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_1$-$R_4$ at least one $R_5$-$R_9$ of and at least one of $R_{10}$-$R_{14}$ is selected from a substituted hydrocarbyl group having 1 to 20 carbon atoms, an unsubstituted hydrocarbyl group having 1 to 20 carbon atoms, an all oxy group having 1 to 20 carbon atoms, a heteroatom, and combinations thereof.

In an embodiment, any consecutive R groups in $R_1$-$R_4$, and/or any consecutive R groups in $R_5$-$R_9$, and/or any consecutive R groups in $R_{10}$-$R_{14}$ may be linked to form an inter-cyclic or an intra-cyclic structure. The inter-/intra-cyclic structure may or may not be aromatic. In an embodiment, the inter-/intra-cyclic structure is a $C_5$ or a $C_6$ membered ring.

In an embodiment, at least one of $R_1$-$R_4$ is selected from a substituted hydrocarbyl group having 1 to 20 carbon atoms ; an unsubstituted hydrocarbyl group having 1 to 20 carbon atoms, and combinations thereof. Optionally, at least one of $R_5$-$R_{14}$ may be a halogen atom or an alkoxy group having 1 to 20 carbon atoms. Optionally, $R_1$-$R_4$, and/or $R_5$-$R_9$, and/or $R_{10}$-$R_{14}$ may be linked to form an inter-cyclic structure or an intra cyclic structure. The inter-cyclic structure and/or the intra-cyclic structure may or may not be aromatic.

In an embodiment, any consecutive R groups $R_1$-$R_4$, and/or in $R_5$-$R_9$, and/or in $R_{10}$-$R_{14}$, may be members of a $C_5$-$C_6$-membered ring.

In an embodiment, structure (I) includes $R_1$, $R_3$ and $R_4$ as hydrogen. $R_2$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In an embodiment, $R_2$ is selected from a $C_1$-$C_8$ alkyl group, a $C_3$-$C_6$ cycloalkyl, or a substituted $C_3$-$C_6$ cycloalkyl group. $R_2$ can be a methyl group, an ethyl group, a n-propyl group, an isopropyl group, a t-butyl group, an isobutyl group, a sec-butyl group, a 2,4,4-trimethylpentan-2-yl group, a cyclopentyl group, and a cyclohexyl group.

In an embodiment, structure (I) includes $R_2$ that is methyl, and each of $R_5$-$R_{14}$ is hydrogen. In an embodiment, structure (I) includes $R_2$ that is ethyl, and each of $R_5$-$R_{14}$ is hydrogen. In an embodiment, structure (I) includes $R_2$ that is t-butyl, and each of $R_5$-$R_{14}$ is hydrogen. In an embodiment, structure (I) includes $R_2$ that is ethoxycarbonyl, and each of $R_5$-$R_{14}$ is hydrogen.

In an embodiment, structure (I) includes $R_2$, $R_3$ and $R_4$ each as hydrogen and $R_1$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In an embodiment, structure (I) includes $R_1$ that is methyl, and each of $R_5$-$R_{14}$ is hydrogen.

In an embodiment, structure (I) includes $R_2$ and $R_4$ that are hydrogen and $R_1$ and $R_3$ are the same or different. Each of $R_1$ and $R_3$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In an embodiment, structure (I) includes $R_1$ and $R_3$ that are the same or different. Each of $R_1$ and $R_3$ is selected from a $C_1$-$C_8$ alkyl group, a $C_3$-$C_6$ cycloalkyl group, or a substituted $C_3$-$C_6$ cycloalkyl group. $R_5$-$R_{14}$ are the same or different and each of $R_5$-$R_{14}$ is selected from hydrogen, a $C_1$-$C_8$ alkyl group, and a halogen. Nonlimiting examples of suitable $C_1$-$C_8$ alkyl groups include methyl, ethyl, n-propyl, isopropyl, n-butyl, i-butyl, t-butyl, n-pentyl, i-pentyl, neopentyl, t-pentyl, n-hexyl, and 2,4,4-trimethylpentan-2-yl group. Nonlimiting examples of suitable $C_3$-$C_6$ cycloalkyl groups include cyclopentyl and cyclohexyl groups. In a further embodiment, at least one of $R_5$-$R_{14}$ is a $C_1$-$C_8$ alkyl group or a halogen.

In an embodiment, structure (I) includes $R_1$ that is a methyl group and $R_3$ that is a t-butyl group. Each of $R_2$, $R_4$ and $R_5$-$R_{14}$ is hydrogen.

In an embodiment, structure (I) includes $R_1$ and $R_3$ that is an isopropyl group. Each of $R_2$, $R_4$ and $R_5$-$R_{14}$ is hydrogen.

In an embodiment, structure (I) includes each of $R_1$, $R_5$, and $R_{10}$ as a methyl group and $R_3$ is a t-butyl group. Each of $R_2$, $R_4$, $R_6$-$R_9$ and $R_{11}$-$R_{14}$ is hydrogen.

In an embodiment, structure (I) includes each of $R_1$, $R_7$, and $R_{12}$ as a methyl group and $R_3$ is a t-butyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ as a methyl group and $R_3$ is a t-butyl group. Each of $R_7$ and $R_{12}$ is an ethyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes each of $R_1$, $R_5$, $R_7$, $R_9$, $R_{10}$, $R_{12}$, and $R_{14}$ as a methyl group and $R_3$ is a t-butyl group. Each of $R_2$, $R_4$, $R_6$, $R_8$, $R_{11}$, and $R_{13}$ is hydrogen.

In an embodiment, structure (I) includes $R_1$ as a methyl group and $R_3$ is a t-butyl group. Each of $R_5$, $R_7$, $R_9$, $R_{10}$, $R_{12}$, and $R_{14}$ is an i-propyl group. Each of $R_2$, $R_4$, $R_6$, $R_8$, $R_{11}$, and $R_{13}$ is hydrogen.

In an embodiment, the substituted phenylene aromatic diester has a structure selected from the group consisting of structures (II)-(V), including alternatives for each of $R_1$ to $R_{14}$, that are described in detail in U.S. Pat. No. 8,536,372, which is incorporated herein by reference.

In an embodiment, structure (I) includes $R_1$ that is a methyl group and $R_3$ is a t-butyl group. Each of $R_7$ and $R_{12}$ is an ethoxy croup. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is a fluorine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is a chlorine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is a bromine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is an iodine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_6$, $R_7$, $R_{11}$, and $R_{12}$ is a chlorine atom. Each of $R_2$, $R_4$, $R_5$, $R_8$, $R_9$, $R_{10}$, $R_{13}$, and $R_{14}$ is hydrogen.

In an embodiment, structure (I) includes $R_1$ that is a methyl group and $R_3$ is a t-butyl group. Each of $R_6$, $R_8$, $R_{11}$, and $R_{13}$ is a chlorine atom. Each of $R_2$, $R_4$, $R_5$, $R_7$, $R_9$, $R_{10}$, $R_{12}$, and $R_{14}$ is hydrogen.

In an embodiment, structure (I) includes $R_1$ that is a methyl group and $R_3$ is a t-butyl group. Each of $R_2$, $R_4$ and $R_5$-$R_{14}$ is a fluorine atom.

In an embodiment, structure (I) includes $R_1$ that is a methyl group and $R_3$ is a t-butyl group. Each of $R_7$ and $R_{12}$ is a trifluoromethyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is an ethoxycarbonyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, $R_1$ is methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is a diethylamino group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a 2,4,4-trimethylpentan-2-yl group. Each of $R_2$, $R_4$ and $R_5$-$R_{14}$ is hydrogen.

In an embodiment, structure (I) includes $R_1$ and $R_3$, each of which is a sec-butyl group. Each of $R_2$, $R_4$ and $R_5$-$R_{14}$ is hydrogen.

In an embodiment, structure (I) includes $R_1$ and $R_4$ that are each a methyl group. Each of $R_2$, $R_3$, $R_5$-$R_9$ and $R_{10}$-$R_{14}$ is hydrogen.

In an embodiment, structure (I) includes $R_1$ that is a methyl group. $R_4$ is an i-propyl group. Each of $R_2$, $R_3$, $R_5$-$R_9$ and $R_{10}$-$R_{14}$ is hydrogen.

In an embodiment, structure (I) includes $R_1$, $R_3$, and $R_4$, each of which is an i-propyl group. Each of $R_2$, $R_5$-$R_9$ and $R_{10}$-$R_{14}$ is hydrogen.

In an embodiment, another procatalyst composition is provided. The procatalyst composition includes a combination of a magnesium moiety, a titanium moiety, and a mixed internal electron donor. As used herein, a "mixed internal electron donor" is (i) a substituted phenylene aromatic diester, (ii) an electron donor component that donates a pair of electrons to one or more metals present in the resultant procatalyst composition, and (iii) optionally other components. In an embodiment, the electron donor component is a phthalate, a diether, a benzoate, and combinations thereof. The procatalyst composition with the mixed internal electron donor can be produced by way of the procatalyst production procedure as disclosed in the previously granted patents and publications identified herein.

For example, suitable catalyst compositions comprise a pro-catalyst composition, a co-catalyst, and an external electron donor or a mixed external electron donor (M-EED) of two or more different components. Suitable external donors include one or more activity limiting agents (ALA), one or more selectivity control agents (SCA) or both an ALA and an SCA. As used herein, an "external electron donor" is a component or a composition comprising a mixture of components added independent of procatalyst formation that modifies the catalyst performance. As used herein, an "activity limiting agent" is a composition that decreases catalyst activity as the polymerization temperature in the presence of the catalyst rises above a threshold temperature (e.g., temperature greater than about 85° C.). A "selectivity control agent" is a composition that improves polymer tacticity, wherein improved tacticity is generally understood to mean increased tacticity or reduced xylene solubles or both. It should be understood that the above definitions are not mutually exclusive and that a single compound may be classified, for example, as both an activity limiting agent and a selectivity control agent.

In an embodiment, the external electron donor includes an aikoxysilane. The alkoxysilane has the general formula:

$$SiR_m(OR')_{4-m} \qquad (I)$$

where R independently each occurrence is hydrogen or a hydrocarbyl or an amino group optionally substituted with one or more substituents containing one or more Group 14, 15, 16 or 17 heteroatoms, said R containing up to 20 atoms not counting hydrogen and halogen; R' is a $C_{1-4}$ alkyl group; and m is 0, 1, 2 or 3. In an embodiment, R is $C_{6-12}$ arylalkyl or aralkyl, $C_{3-12}$ cycloalkyl, $C_{3-12}$ branched alkyl, or $C_{3-12}$ cyclic or acyclic amino group, R' is $C_{1-4}$ alkyl, and m is 1 or 2.

Nonlimiting examples of suitable silane compositions include dicyclopentyldimedioxysilane; di-tert-butyldimethoxysilane; methylcyclohexyldimethoxysilane; methycyclohexyldiethoxysilane; ethylcyclohexyldimethoxysilane; diphenyldimethoxysilane; diisopropyldimethoxysilane; di-n-propyldimethoxysilane; diisobutyldimethoxysilane; diisobutyldiethoxysilane; isobutylisopropyldimethoxysilane; di-n-butyldimethoxysilane; cyclopentyltrimethoxysilane; isopropyltrimethoxysilane; n-propyltrimethoxysilane; n-propyltriethoxysilane; ethyltriethoxysilane; tetramethoxysilane; tetraethoxysilane; diethylaminotriethoxysilane; cyclopentylpyrrolidinodimethoxysilane; bis(pyrrolidino)dimedioxysilane; bis(perhydroisoquinolino)dimethoxysilane, and dimethyldimethoxysilane. In an embodiment, the silane composition is dicyclopentyldimethoxysilane (DCPDMS); methylcyclohexyldimethoxysilane (MChDMS); or n-propyltrimethoxysilane (NPTMS); and any combination of thereof.

In an embodiment, the selectivity control agent component can be a mixture of 2 or more alkoxysilanes. In a further embodiment, the mixture can be dicyclopentyldimethoxysilane and methylcyclohexyldimethoxysilane, dicyclopentyldimethoxysilane and tetraethoxysilane, or dicyclopentyldimethoxysilane and n-propyltriethoxysilane. In an embodiment, the mixed external electron donor may include a benzoate, a succinate, and/or or a diol ester. In an embodiment, the mixed external electron donor includes 2,2,6,6-tetramethylpiperidine as an SCA. In another embodiment, the mixed external electron donor includes a diether as both an SCA and an ALA.

A mixed external electron donor system can also include an activity limiting agent (ALA). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester, a diether, a poly(alkene glycol), a diol ester; and combinations thereof. The carboxylic acid ester can be an aliphatic or aromatic, mono- or poly-carboxylic acid ester. Nonlimiting examples of suitable monocarboxylic acid esters include ethyl and methyl benzoate; ethyl p-methoxybenzoate; methyl p-ethoxbenzoate; ethyl p-ethoxybenzoate; ethyl p-isopropoxybenzoate; ethyl acrylate; methyl methacrylate; ethyl acetate; ethyl p-chlorobenzoate; hexyl p-aminobenzoate; isopropyl naphthenate; n-amyl toluate; ethyl cyclohexanoate and propyl pivalate.

Nonlimiting examples of suitable polycarboxylic acid esters include dimethyl phthalate; diethyl phthalate; di-n-propyl phthalate; diisopropyl phthalate; di-n-butyl phthalate; diisobutyl phthalate; di-tert-butyl phthalate; diisoamyl phthalate; di-tert-amyl phthalate; dineopentyl phthalate; di-2-ethylhexyl phthalate; di-2-ethyldecyl phthalate; diethyl terephthalate; dioctyl terephthalate; and bis[4-(vinyloxy) butyl]terephthalate.

The aliphatic carboxylic acid ester may be a $C_4$-$C_{30}$ aliphatic acid ester, may he a mono- or a poly-(two or more) ester, may be straight chain or branched, may be saturated or unsaturated, and any combination thereof. The $C_6$-$C_{30}$ aliphatic acid ester may also be substituted with one or more Group 14, 15 or 16 heteroatom containing substituents. Nonlimiting examples of suitable $C_6$-$C_{30}$ aliphatic acid esters include $C_{1-20}$ alkyl esters of aliphatic $C_{6-30}$ monocarboxylic acids, $C_{1-20}$ alkyl esters of aliphatic $C_{8-20}$ monocarboxylic acids, $C_{1-4}$ allyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{6-20}$ mono- or polycarboxylate derivatives of $C_{2-100}$ (poly) glycols or $C_{2-100}$ (poly)glycol ethers. In a further embodiment, the $C_6$-$C_{30}$ aliphatic acid ester may be a laurate, a myristate, a palmitate, a stearate, an oleate, a sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl tri(acetate), glyceryl tri-ester of $C_{2-40}$ aliphatic carboxylic acids, and mixtures thereof. In a further embodiment, the $C_6$-$C_{20}$ aliphatic ester is isopropyl myristate or di-n-butyl sebacate.

In an embodiment, the activity limiting agent includes a diether. The diether can be a 1,3-diether compound represented by the following structure (VI):

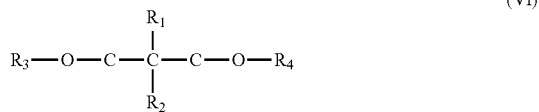
(VI)

wherein $R_1$ to $R_4$ are independently of one another an alkyl, aryl or aralkyl group having up to 20 carbon atoms, which may optionally contain a group 14, 15, 16, or 17 heteroatom, and $R_1$ and $R_2$ may be a hydrogen atom. The dialkylether may linear or branched, and may include one or more of the following groups: alkyl, cycloaliphatic, aryl, alkylaryl or arylalkyl radicals with 1-18 carbon atoms, and hydrogen. $R_1$ and $R_2$ may he linked to form a cyclic structure, such as cyclopentadiene or fluorene.

In an embodiment, the activity limiting agent includes a succinate composition having the following structure (VII):

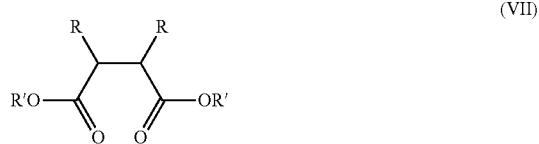
(VII)

wherein R and R' may be the same or different, R and/or R' including one or more of the following groups: hydrogen, linear or branched alkyl, alkenyl, cycloalkyl, aryl, arylalkyl or alkylaryl group, optionally containing heteroatoms. One or more ring structures can be formed via one or both 2- and 3-position carbon atom.

In an embodiment, the activity limiting agent includes a diol ester as represented by the following structure (VIII):

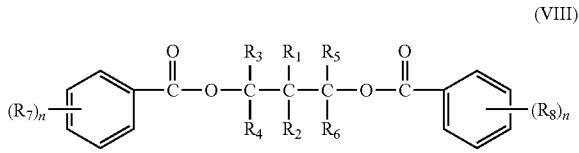
(VIII)

wherein n is an integer from 1 to 5. $R_1$ and $R_2$, may be the same or different, and each may be selected from hydrogen, methyl, ethyl, n-propyl, i-propyl, n-butyl, i-butyl, t-butyl, allyl, phenyl, or halophenyl group. $R_3$, $R_4$, $R_5$, $R_6$, $R_7$, and $R_8$ may be the same or different, and each may be selected from hydrogen, halogen, substituted, or unsubstituted hydrocarbyl having 1 to 20 carbon atoms. $R_1$-$R_6$ groups may optionally contain one or more heteroatoms replacing carbon, hydrogen or both, the hetero-atom selected from nitrogen, oxygen, sulfur, silicon, phosphorus and a halogen. $R_7$ and $R_8$, may be the same or different, and may be bonded to any carbon atom of the 2-, 3-, 4-, 5-, and 6-position of either phenyl ring.

Individual external electron donor components can be added into the reactor separately or two or more can be mixed together in advance and then added into the reactor as a mixture. In the mixture, more than one selectivity control agent or more than one activity limiting agent can be used. In an embodiment, the mixture is dicyclopentyldimethoxysilane and isopropyl myristate; diisopropyldimethoxysilane and isopropyl myristate; dicyclopentyldimethoxysilane and poly(ethylene glycol) laurate; dicyclopentyldimethoxysilane and isopropyl myristate and poly(ethylene glycol) dioleate; methylcyclohexyldimethoxysilane and isopropyl myristate; n-propyltrimethoxysilane and isopropyl myristate; dimethyldimethoxysilane and methylcyclohexyldimethoxysilane and isopropyl myristate; dicyclopentyldimethoxysilane and n-propyltriethoxysilane and isopropyl myristate; diisopropyldimethoxysilane and n-propyltriethoxysilane and isopropyl myristate; and dicyclopentyldimethoxysilane and tetraethoxysilane and isopropyl myristate; dicyclopentyldimethoxysilane and diisopropyldimethoxysilane and n-propyltriethoxysilane and isopropyl myristate; and combinations thereof.

The catalyst composition includes a cocatalyst. The cocatalyst for use with the Ziegler-Natta procatalyst composition may be an aluminum containing composition. Nonlimiting examples of suitable aluminum containing compositions include organoaluminum compounds, such as trialkylaluminum; dialkylaluminum hydride; alkylaluminum dihydride; dialkylaluminum halide; alkylaluminumdihalide; dialkylaluminum alkoxide; and alkylaluminum dialkoxide-compounds containing from 1-10, or 1-6 carbon atoms in each alkyl- or alkoxide-group. In an embodiment, the cocatalyst is a $C_{1-4}$trialkylaluminum compound, such as triethylaluminum (TEA). The catalyst composition includes a mole ratio of aluminum (Al) to (SCA(s)+ALA(s)) of 0.5-25:1; or 1.0-20:1; or 1.5-15:1; or less than about 6.0; or less than about 5; or less than 4.5. In an embodiment, the Al:(SCA(s)+ALA(s)) mole ratio is 0.5-4.0:1. The total-SCA to ALA mole ratio is 0.01-20:1; 0.10-5.00:1; 0.43-2.33:1; or 0.54-1.85:1; or 0.67-1.5:1.

IV. Hot Fill Packaging

In another embodiment, a hot fill packaging can be produced using the propylene-ethylene copolymers discussed above. The hot fill packaging can be injection molded. Preferably, the resin used in the hot fill packaging comprises 100% of the propylene ethylene copolymer resins of the present invention, but up to 5%, 10%, 15% or even 25% by weight of one or more additional resins other than the copolymers defined herein may be added.

The copolymer composition used for making the hot fill packaging preferably contains antioxidants and acid scavengers, and in some applications may preferably also contain other additives commonly used in PP such as nucleators, clarifiers, mold release agents, antistats, slip agents, UV stabilizers, and colorants (pigments).

In one embodiment, the copolymer composition can further contain a type of nucleator called a clarifying agent or clarifier. The clarifying agent can be added to further improve the transparency properties of the composition. The clarifying agent, for instance, can comprise a compound capable of producing a gelation network within the composition.

In one embodiment, the clarifying agent may comprise a sorbitol compound, such as a sorbitol acetal derivative. In one embodiment, for instance, the clarifying agent may comprise a dibenzyl sorbitol.

With regard to sorbitol acetal derivatives that can be used as an additive in some embodiments, the sorbitol acetal derivative is shown in Formula (I):

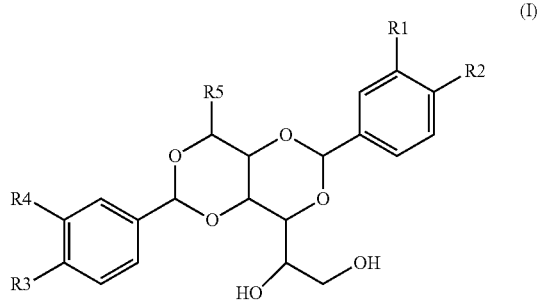

wherein R1-R5 comprise the same or different moieties chosen from hydrogen and a C1-C3 alkyl.

In some embodiments, R1-R5 are hydrogen, such that the sorbitol acetal derivative is 2,4-dibenzylidene sorbitol ("DBS"). In some embodiments, R1, R4, and R5 are hydrogen, and R2 and R3 are methyl groups, such that the sorbitol acetal derivative is 1,3:2,4-di-p-methyldibenzylidene-D-sorbitol ("MDBS"). In some embodiments, R1-R4 are methyl groups and R5 is hydrogen, such that the sorbitol acetal derivative is 1,3:2,4-Bis (3,4-dimethylobenzylideno) sorbitol ("DMDBS"). In some embodiments, R2, R3, and R5 are propyl groups (—CH2-CH2-CH3), and R1 and R4 are hydrogen, such that the sorbitol acetal derivative is 1,2,3-trideoxy-4,6:5,7-bis-O-(4-propylphenyl methylene) nonitol ("TBPMN").

Other embodiments of clarifying agents that may be used include: 1,3:2,4-dibenzylidenesorbitol; 1,3:2,4-bis(p-methylbenzylidene)sorbitol; di(p-methylbenzylidene)sorbitol; di(p-ethylbenzylidene)sorbitol; and bis(5',6',7',8'-tetrahydro-2-naphtylidene)sorbitol.

In one embodiment, the clarifying agent may also comprise a bisamide. The clarifying agents described above can be used alone or in combination.

When present in the polymer composition, one or more clarifying agents are generally added in an amount greater than about 1,500 ppm, such as in an amount greater than about 1,800 ppm, such as in an amount greater than about 2,000 ppm, such as in an amount greater than about 2,200 ppm. One or more clarifying agents are generally present in an amount less than about 20,000 ppm. such as less than about 15,000 ppm, such as less than about 10,000 ppm, such as less than about 8,000 ppm, such as less than about 5,000 ppm.

V. Examples

Example No. 1. Propylene-ethylene random copolymer samples were produced and their properties tested in accordance with the procedures outlined above. The properties and experimental results are outlined in Table 1. Also, FIG. 1 includes a graph of xylene solubles to ethylene content.

The propylene-ethylene random copolymers were produced with a stereospecific 6$^{th}$ generation Ziegler-Natta magnesium supported/titanium-based catalyst. The catalyst contained a non-phthalate internal donor producing polymers having a broader molecular weight distribution than polymers made using metallocene catalyst. The process used to produce the polymers is described in the art as the UNIPOL gas phase process. The catalyst used to produce the polymers included a substituted phenylene aromatic diester internal electron donor. The catalyst used is commercially available from W.R. Grace and Company and sold under the trade name CONSISTA. All copolymers were made using triethylaluminum as a cocatalyst.

TABLE 1

Propylene-Ethylene Random Copolymer Examples

| Sample | Ethylene wt. % | XS (wt. %) wet | XS/ET | MFR (g/10 min) |
|---|---|---|---|---|
| 1 | 4.44 | 6.61 | 1.49 | 87.0 |
| 2 | 4.48 | 5.41 | 1.21 | 44.5 |
| 3 | 3.80 | 5.03 | 1.32 | 42.4 |
| 4 | 4.30 | 5.85 | 1.36 | 42.1 |
| 5 | 3.78 | 5.00 | 1.32 | 42.4 |
| 6 | 4.44 | 6.61 | 1.49 | 87.00 |
| 7 | 3.12 | 3.60 | 1.15 | 12.06 |
| 8 | 3.85 | 3.52 | 0.91 | 14.03 |
| 9 | 3.89 | 3.52 | 0.90 | 11.79 |
| 10 | 3.80 | 5.03 | 1.32 | 42.36 |
| 11 | 4.30 | 5.85 | 1.36 | 42.12 |
| 12 | 4.50 | 5.41 | 1.20 | 44.50 |
| 13 | 4.00 | 5.31 | 1.33 | 28.02 |
| 14 | 3.90 | 5.72 | 1.47 | 26.00 |
| 15 | 4.20 | 6.14 | 1.46 | 16.31 |
| 16 | 3.50 | 4.41 | 1.26 | 12.59 |
| 17 | 3.50 | 4.41 | 1.26 | 12.34 |
| 18 | 3.60 | 5.32 | 1.48 | 11.56 |
| 19 | 5.00 | 6.35 | 1.27 | 12.52 |
| 20 | 5.00 | 6.35 | 1.27 | 11.71 |
| 21 | 2.5 | 2.98 | 1.19 | 22.99 |
| 22 | 2.52 | 3.48 | 1.38 | 25.14 |
| 23 | 2.53 | 3.01 | 1.19 | 25.68 |
| 24 | 3.54 | 4.41 | 1.25 | 12.59 |
| 25 | 3.53 | 4.41 | 1.25 | 12.34 |
| 26 | 3.56 | 5.32 | 1.49 | 11.56 |
| 27 | 5 | 6.35 | 1.27 | 12.52 |
| 28 | 4.98 | 6.35 | 1.28 | 11.71 |
| 29 | 2.55 | 3.33 | 1.31 | 12.69 |
| 30 | 2.54 | 3.33 | 1.31 | 12.28 |
| 31 | 3.13 | 3.37 | 1.08 | 43.63 |
| 32 | 3.2 | 3.51 | 1.10 | 43.6 |
| 33 | 3.15 | 4.42 | 1.40 | 45.2 |
| 34 | 2.79 | 3.98 | 1.43 | 52.98 |

Example No. 2. Another propylene-ethylene random copolymer was made in accordance with the present disclosure using generally the same process as described above and compared to a control having all XS/ET ratio of 2. The propylene-ethylene random copolymers were injection molded into test plaques and tested for haze. Haze was tested initially and after thermal aging. The propylene-ethylene random copolymers are as follows:

TABLE 2

Propylene-Ethylene Random Copolymer Examples

| Sample | Ethylene wt. % | XS (wt. %) wet | XS/ET | MFR (g/10 min) |
|---|---|---|---|---|
| Comparative | 4.10 | 8.2 | 2.00 | 40.7 |
| 35 | 3.78 | 5.0 | 1.33 | 42.4 |

Haze was measured according to ASTM Test D1003, procedure A using the latest version of the test. Haze was measured before and after 24 hour thermal aging at 55° C. using BYK Gardner Haze-Gard Plus 4725 instrument. Thermal aging was conducted by placing the plaque samples into an oven. During thermal aging, propylene polymer compositions have a tendency to increase in haze. Haze is increased due to further crystallization within the polymer and/or due to the formation of a hazy surface layer, which is typically referred to as blooming.

In forming the test plaques, the propylene-ethylene random copolymers were compounded with various stabilizers. In particular, the polymer compositions contained 500 ppm of a hindered phenolic antioxidant, namely pentaerythritol tetrakis(3-(3,5-di-tert-butyl-4-hydroxyphenyl)propionate). A phosphite stabilizer was added at an amount of 700 ppm. The phosphite stabilizer was tris(2,4-ditert-butylphenyl) phosphite. An acid scavenger was added at a concentration of 200 ppm. The acid scavenger used was a hydrotalcite. An antistatic agent was added at a concentration of 500 ppm. The antistatic agent was composed of a distilled monoglyceride, particularly DIMODAN HS K-A GMS90 marketed by DuPont. A clarifying agent was also added to the compositions at a concentration of 1800 ppm. The clarifying agent used was 1,2,3-tridesoxy-4,6:5,7-bis-O-[(4-propylphenyl)methylene]nonitol, particularly Milliken Millad NX8000.

The polymer compositions were injection molded into plaques having three thicknesses at 40 mil, 80 mil, and 125 mil. The plaques were tested for haze before and after oven aging. The following results were obtained:

| Haze Measurement | | | | | | | | | | | | | |
|---|---|---|---|---|---|---|---|---|---|---|---|---|---|
| Before Oven % | | | After Oven % | | | After-Before | | | % Increase | | | Visual | Smear |
| Comparative | | | | | | | | | | | | | |
| 9.5 | 22.4 | 42.6 | 15.0 | 26.0 | 49.6 | 5.5 | 3.6 | 7.0 | 36.7 | 13.9 | 14.2 | 4 | 4 |
| Sample 35 | | | | | | | | | | | | | |
| 10.3 | 24.0 | 44.2 | 11.6 | 25.9 | 46.4 | 1.3 | 1.9 | 2.2 | 11.4 | 7.3 | 4.7 | N | N |

As shown above, the propylene-ethylene random copolymer of the present disclosure had unexpectedly better haze properties in comparison to similar conventional propylene-ethylene random copolymers. For example, one significant result is the fact that there is no visual blooming or smearing even after heat treatment.

As shown above, polymer compositions made in accordance with the present disclosure can display a haze at 40 mil of less than about 15%, such as less than about 12%, such as less than about 11%. In addition, after aging for 24 hours at 55° C., the haze increase is less than about 15%, such as less than about 14%, such as less than about 13%, such as less than about 12%. When measuring an 80 mil sample, the initial haze is generally less than about 35%, such as less than about 30%, such as less than about 25%. After thermal aging for 24 hours at 55° C., the % increase in haze is generally less than about 12%, such as less than about 11%, such as less than about 10%, such as less than about 9%, such as less than about 8%, such as less than about 7.5%. When measuring an 125 mil sample, the initial haze is generally less than about 50%, such as less than about 46%, such as less than about 45%. After thermal aging for 24 hours at 55° C., the % increase in haze is generally less than about 10%, such as less than about 8%, such as less than about 6%, such as less than about 5%.

Example No. 3. Propylene-ethylene random copolymer samples were produced using the same procedures as described in Example No. 1. The samples were tested for various physical properties. The following results were obtained:

| Sample No. | 36 | 37 | 38 |
|---|---|---|---|
| XS(wt %) wet | 3.5 | 7.9 | 9.4 |
| MF (g/10 min) | 11.8 | 12.1 | 11.4 |
| Et (wt %) | 3.9 | 4.1 | 4.2 |
| Gardner Impact Strength (at 23° C. inch-lbs) | 10.0 | 26.4 | 71.3 |
| Flex. Mod., (MPa) | 164800 | 131800 | 128000 |
| N-Izod, (ft-lb/in), RT | 1.39 | 3.15 | 4.87 |
| Haze, % | 9.1 | 8.2 | 9.0 |

As shown above, Sample No. 36 had improved stiffness in relation to Sample Nos. 37 and 38.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A propylene-ethylene copolymer comprising:
propylene as a primary monomer;
an ethylene content (ET) of 3.0% to 5% by weight;
a melt flow rate of from 20 to 45 g/10 min;
a xylene soluble fraction (XS) of from 2.0% to 7.0% by weight; and
a xylene soluble fraction to ethylene content ratio (XS/ET) of less than or equal to 1.49.

2. The propylene-ethylene copolymer of claim 1, wherein the ethylene content is from 3.0% to 4.2% by weight.

3. The propylene-ethylene copolymer of claim 1, wherein the melt flow rate is 20 to 40 g/10 min.

4. The propylene-ethylene copolymer of claim 1, wherein the xylene ratio XS/ET is from 0.90 to 1.4.

5. The propylene-ethylene copolymer of claim 1, wherein the ratio XS/ET is less than 1.30.

6. The propylene-ethylene copolymer of claim 1, wherein the ratio XS/ET is less than 1.00.

7. The propylene-ethylene copolymer of claim 1, wherein the xylene soluble fraction (XS) and the ethylene content (ET) are below a line defined by equation $XS = 2.1e^{0.297\,(ET)}$.

8. The propylene-ethylene copolymer of claim 1, wherein the xylene soluble fraction (XS) and the ethylene content (ET) are above a line defined by equation $XS = 1.4e^{0.297\,(ET)}$.

9. The propylene-ethylene copolymer of claim 1, wherein the copolymer is formed using a Ziegler-Natta catalyst and a dicyclopentyldimethoxysilane (DCPDMS) based donor.

10. The propylene-ethylene copolymer of claim 1, wherein the copolymer is formed using a Ziegler-Natta catalyst and a n-propyltrimethoxysilane (NPTMS) based donor.

11. The propylene-ethylene copolymer of claim 1, wherein the copolymer is produced without the use of metallocenes.

12. The propylene-ethylene copolymer of claim 1, wherein the copolymer has a molecular weight distribution (Mw/Mn) of greater than about 3.5.

13. A polymer composition containing the propylene-ethylene copolymer of claim 1, wherein the propylene-ethylene copolymer is present in the polymer composition in an amount greater than about 70% by weight.

14. The polymer composition of claim 13, further comprising a clarifying agent.

15. The polymer composition of claim 14, wherein the clarifying agent comprises a dibenzyl sorbitol.

16. The polymer composition of claim 14, wherein the clarifying agent comprises a nonitol.

17. The polymer composition of claim 14, wherein the polymer composition displays a haze at 40 mil of less than about 15% and wherein after thermal aging for 24 hours at 55° C., the haze decreases by no more than about 15%.

18. An injection molded article comprising the propylene-ethylene copolymer of claim 1.

19. A hot fill packaging container comprising the propylene-ethylene copolymer of claim 1.

20. A propylene-ethylene copolymer comprising:
propylene as a primary monomer;
an ethylene content (ET) of about 3.0% to about 5% by weight;
a melt flow rate of from 20 to 45 g/10 min;
a xylene soluble fraction (XS) of from 2.0% to 7.0% by weight;
a molecular weight distribution greater than about 6.0 and
a xylene soluble fraction to ethylene content
a ratio (XS/ET) of less than or equal to 1.51.

* * * * *